Nov. 9, 1926. 1,606,332
C. A. ANDERSON ET AL
CHILD'S VEHICLE
Filed July 9, 1923 2 Sheets-Sheet 1
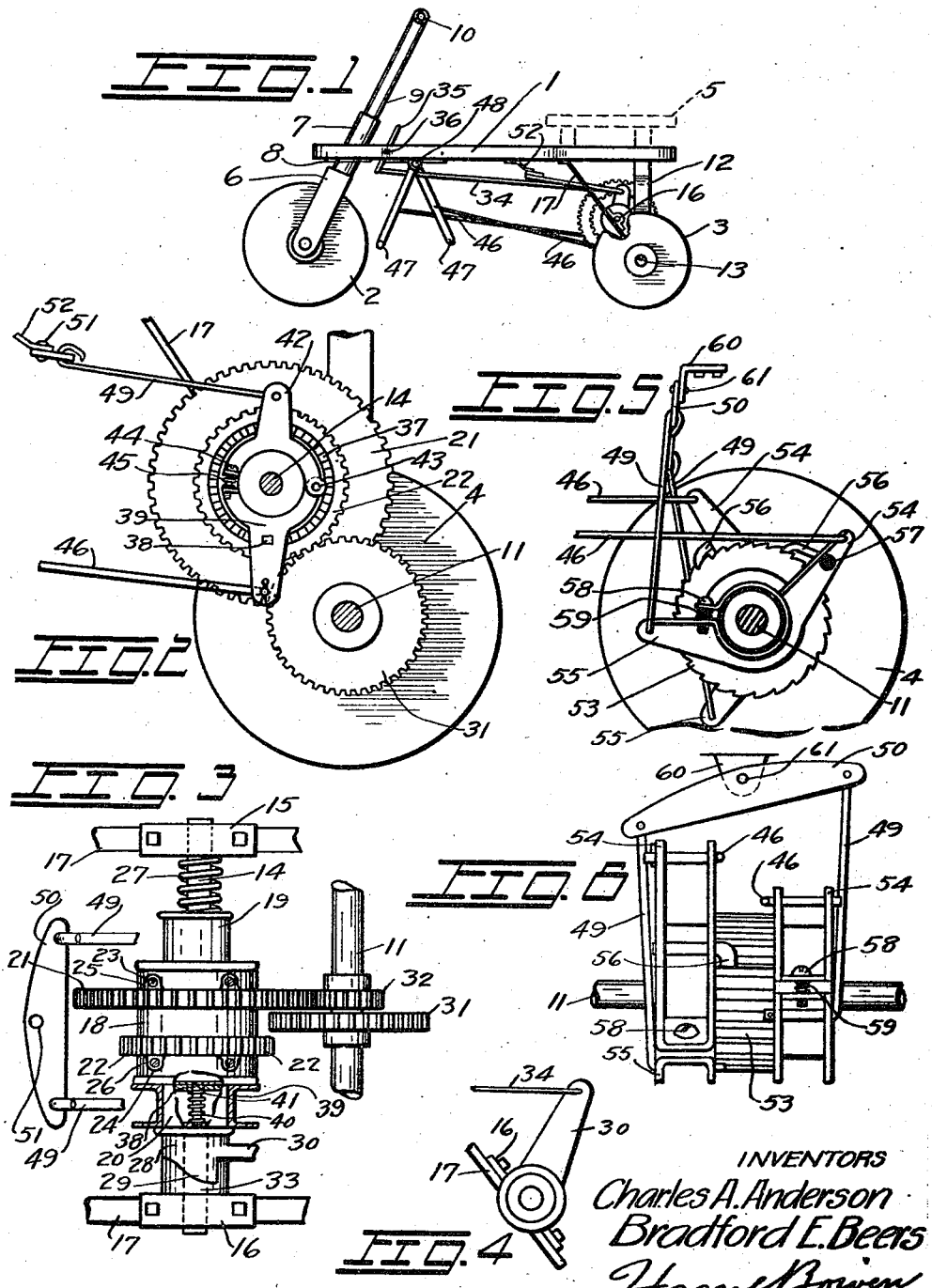
INVENTORS
Charles A. Anderson
Bradford E. Beers
Harry Bowen
ATTORNEY Nov. 9, 1926.   
C. A. ANDERSON ET AL   
1,606,332

CHILD'S VEHICLE

Filed July 9, 1923    2 Sheets-Sheet 2

Inventor  
Charles A. Anderson  
Bradford E. Beers  
By Harry Bowen  
Attorney

Patented Nov. 9, 1926.

1,606,332

UNITED STATES PATENT OFFICE.

CHARLES A. ANDERSON AND BRADFORD E. BEERS, OF SEATTLE, WASHINGTON.

CHILD'S VEHICLE.

Application filed July 9, 1923. Serial No. 650,540.

The invention is a child's vehicle, that is propelled by pedals, which are arranged so that they can never stop on each side of the center, and which is provided with brakes, that positively grip drums on the rear axle.

The object of the invention is to provide a child's vehicle that may be propelled by pedals, which are arranged so that they will always act on one side of a center.

Another object of the invention is to provide a child's vehihle, having a means for propelling, with positive brakes operated by the propelling means.

And a further object of the invention is to provide a child's vehicle, having a means for propelling with gears that may be shifted to change the speed.

With these ends in view the invention embodies a vehicle having two rear wheels and one front wheel; a post for turning the front wheel, pedals connected to suitable gears for driving the rear wheels, brakes that may be operated by the pedals, and a means for shifting the gears for different speeds.

Other features and advantages of the invention will appear from the following description taken in connection with the drawings, wherein:

Figure 1 is a side elevation.

Figure 2 is a detail showing a side view of the driving gears, with the low speed gears in mesh.

Figure 3 is a plan view of the gears shown in Figure 2, with the high speed gears in mesh.

Figure 4 is a detail showing the shift lever.

Figure 5 is a detail similar to that shown in Figure 2, showing an alternate design, which has only one speed.

Figure 6 is a side view of the design shown in Figure 5.

Figure 7:
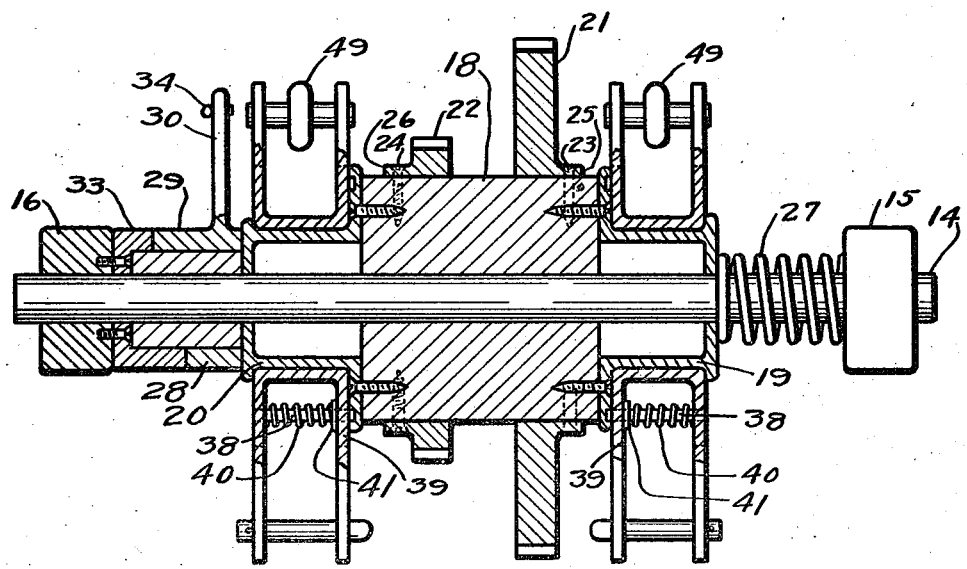
Figure 7 is a longitudinal section on the center line of the shaft 14.

In the drawings we have shown our device as it would be constructed, wherein numeral 1 indicates the seat or body, numeral 2 the front wheel, and numerals 3 and 4 the rear wheels.

The body 1 may be constructed of a flat board, as shown, or of any suitable material and of any suitable design. It may also have a raised seat 5, as shown by dotted lines in Figure 1, on it, so that the distance from the seat to the pedals may be increased if desired.

The front wheel 2 may be rotatably mounted in a yoke 6, and the yoke may be pivotally supported in a sleeve 7, which is held to the base of the body 1 by a flange 8. A post 9 projects from the yoke 6, up through the sleeve 7, and may have suitable handles 10 at its upper end.

The rear wheels 3 and 4 are mounted upon an axle 11, which is held in suitable bearings at the lower end of a vertical member 12, which extends downward from the rear of the body 1. One of the rear wheels is freely mounted upon the shaft and the other is fixedly mounted upon it by a key, as shown in Figure 1. It is understood that although we have shown a key, any other suitable means may be used for causing the wheel to turn with the shaft. Another shaft 14 may be mounted in bearings 15 and 16 on the diagonal braces 17, and in the center of this shaft is a cylindrical wood block 18, to the ends of which the stamped metal drums 19 and 20, are attached, and on the outer surface of which are the gears 21 and 22, which are held in place by screws 23 and 24, passing through lugs 25 and 26 on the sides of the gears. At one end of the shaft 14 is a spring 27, which holds the gears in the position shown in Figures 3 and 7 and at the opposite end is a sleeve 28, with a cam shaped projection 29 on it, and a lever 30 projecting from it, for shifting the gears, so that the gear 22 will mesh with a gear 31, that is fixedly mounted on the axle 11, and the gear 21 will move out of engagement with a gear 32, that is also fixedly mounted on the axle 11. The cam 29 bears against a similar surface in a sleeve 33, which may be attached to the bearing 16, and at the outer end of the lever 30 is a rod 34, which connects the lever to a small lever 35, that is pivotally mounted on a pin 36 at the forward end of the device.

In the sides of the inner ends of the drums 19 and 20 are notches 37, into which a latch 38 projects. The latch is slidably mounted in one of the outer sections 39 of the brake, and is held inward by a spring 40 bearing against a collar 41 around its inner end.

This section 39 of the brake is hinged to another section 42 by a hinge 43, and at the forward side of the brake drums the sections 39 and 42 are held together by screws 44, as shown in Figure 2. These sections 39 and 42 of the brakes are mounted on the drums 19 and 20, as shown in Figure 3; the brakes on one side being omitted to show the drum 19 and broken away at the center on the other side, thereby showing a section through the sections 39 of the brakes. Springs 45 may be placed around the screws to force the sections open as the brakes are released. Rods 46 are pivotally attached to the outer ends of the sections 39, and the opposite ends of these rods are pivotally attached to the pedals 47, which are mounted on a pin 48 on the lower side of the body 1. It will be seen that as one of the rods 46 is moved forward the latch 38 will engage the notches 37 and cause the cylinder 18 to rotate, which will rotate the rear axle through the gears and move the car. Rods 49 are pivotally attached to the outer ends of sections 42 and the outer ends of these rods are attached to a walking beam 50, which is pivotally attached by a pin 51 to a bracket 52 on the under side of the body 1. This walking beam will limit the moving of the pedals so that it will only be possible to move the latches 38 a short distance backward and forward, which will keep them on the same side of the center so that it will be absolutely impossible for the pedals to lock with one on each side of the center, as is often the case with a similar vehicle operated on a complete eccentric.

The walking beam will also make it possible to apply the brakes by pushing both of the pedals forward, as the beam will hold the sections 42 rigid as the pedals force the sections 39 forward, which action will cause the sections to positively grip the brake drums and prevent the toy moving in either direction.

In Figure 5 we have shown an alternate design in which a common gear or ratchet 53 is fixedly mounted directly on the rear axle 11, and on each side of this gear are brake drums similar to the drums 19 and 20 shown in Figure 3. In this design the sections of the brake are made as shown with extensions 54 and 55, and latches 56 projecting from the sides of the extensions 54 toward the gear so that they will engage the teeth. These latches have springs 57 on them for holding the points downward. The sections of the brakes are circular with their open ends held together by screws 58 with springs 59 on them similar to the screws and springs 44 and 45 shown in Figure 2. The rods 46 may be attached to the outer ends of the extensions 54, and the rods 49 from the walking beam 50 may be attached to the outer ends of the extensions 55. The walking beam 50 will be arranged in a vertical position in this design, and pivotally attached to a support 60 by a pin 61. It will be seen that as the rods 46 are pulled forward, the latches 56 will engage the teeth of the gear 53 and cause it to rotate until the pedal reaches the end of its stroke, and as it is moving forward, the walking beam is causing the latch on the opposite side of the gear to move backward. The actual movement of the latches is only through an arc on the upper side of the gear, and as this arc does not even approach a semi-circle it would be impossible for the pedals to lock on each side of the center, as is often the case with a crank shaft. It will also be seen that as both of the rods 46 are pulled forward the walking beam will hold the extensions 55 upward, so that the sections forming the brake shoes will spring and positively grip the drum and prevent the vehicle moving.

The construction will be readily understood from the foregoing description. To use the device it may be assembled as shown as it will be seen that as the pedals are moved forward they will rotate one of the rear wheels and move the vehicle forward. It will be seen that it will be impossible for the vehicle to move backward, as the teeth of the gears would engage the ratchets and the walking beam positively prevents both the ratchets moving backward at the same time, as hereinbefore described. The normal speed of the vehicle may be governed by the ratio of the gears 21 and 32 as shown in Figure 3. However, when it is desired to climb a hill, the gears may be shifted by the lever 35, so that it will be possible to lower the speed, and thereby apply a greater force without increasing the effort. This will make it possible for a small child to propel the vehicle and also, by using the brakes, for him to slow up or stop the vehicle without scraping his shoes on the ground.

Having thus fully described the invention, what we claim as new and desire to secure by Letters Patent, is:

1. In a toy of the class described, a body portion comprising a flat piece of material, a front wheel pivotally mounted in a yoke with a stem having handles in its upper end extending upward therefrom, said yoke being pivotally mounted in the forward end of the body, two rear wheels fixedly mounted on a common axle, a bracket on the under side of the body and at the rear for supporting the said axle, gears on the said axle, other gears meshing with the said former gears and mounted on an auxiliary shaft, brake drums on the gears on the auxiliary shaft, brake shoes around the said drums, a latch in connection with the gears on the auxiliary shaft to prevent them rotating in one direction, pedals with suitable levers to connect with the gears for causing the gears to rotate as the pedals are operated, means for operating the said brakes and other means for shifting the said gears.

2. In a child's vehicle of the class described a body mounted on wheels, gears in combination with the wheels, other gears for engaging said former gears, pedals for operating the said latter gears, means for shifting the said latter gears in relation to the said former gears, and suitable brakes for holding the vehicle through the gears with means for operating them.

CHARLES A. ANDERSON.
BRADFORD E. BEERS.